(12) United States Patent
Rudolph et al.

(10) Patent No.: US 10,962,468 B2
(45) Date of Patent: Mar. 30, 2021

(54) SENSOR DEVICE WITH AN AIR MASS SENSOR FOR A WEATHERING DEVICE

(71) Applicant: ATLAS Material Testing Technology GmbH, Linsengericht-Altenhaßlau (DE)

(72) Inventors: Bernd Rudolph, Alzenau (DE); Peter March, Frankfurt am Main (DE)

(73) Assignee: ATLAS Material Testing Technology GmbH, Linsengericht-Altenhaßlau (DE)

( * ) Notice: Subject to any disclaimer, the term of this patent is extended or adjusted under 35 U.S.C. 154(b) by 159 days.

(21) Appl. No.: 16/191,573

(22) Filed: Nov. 15, 2018

(65) Prior Publication Data

US 2019/0145884 A1 May 16, 2019

(30) Foreign Application Priority Data

Nov. 16, 2017 (EP) ..................................... 17202034

(51) Int. Cl.
*G01F 1/69* (2006.01)
*G01N 17/00* (2006.01)
*G01F 1/684* (2006.01)
*G01F 15/02* (2006.01)

(52) U.S. Cl.
CPC ......... *G01N 17/004* (2013.01); *G01F 1/6842* (2013.01); *G01F 1/69* (2013.01); *G01F 15/02* (2013.01); *G01N 17/002* (2013.01)

(58) Field of Classification Search
CPC .. G01N 17/004; G01N 17/002; G01F 1/6842; G01F 1/69; G01F 15/02
See application file for complete search history.

(56) References Cited

U.S. PATENT DOCUMENTS

| 7,353,722 B2 * | 4/2008 | Schonlein | G01N 17/00 250/492.1 |
| 2009/0031820 A1 | 2/2009 | Kranzmann et al. | |
| 2014/0208755 A1 * | 7/2014 | Ekanayake | G01F 15/00 60/722 |
| 2015/0068327 A1 * | 3/2015 | Rudolph | G01N 17/004 73/865.6 |
| 2015/0068328 A1 * | 3/2015 | Rudolph | G01N 17/002 73/865.6 |
| 2016/0041084 A1 * | 2/2016 | March | G01N 17/006 73/865.6 |

FOREIGN PATENT DOCUMENTS

| EP | 1517132 A1 | 3/2005 |
| EP | 1703263 A2 | 9/2006 |

OTHER PUBLICATIONS

EP Search Report cited in Corresponding EP Application No. 17202034.9 dated Apr. 6, 2018.

* cited by examiner

*Primary Examiner* — Jamel E Williams
(74) *Attorney, Agent, or Firm* — Cooper Legal Group, LLC

(57) ABSTRACT

The sensor device (100; 200) for a device (10) for weathering or lightfastness testing of samples comprises a sensor housing (110) which is adapted to be arranged in a weathering chamber (1) of the device (10) in the same manner as a sample (3), and an air mass sensor (120; 220) which comprises a sensor element (120.2; 220.2) and is attached to the sensor housing (110) in such a manner that the sensor element (120.2; 220.2) is adapted to be mounted on the sensor housing (110.2; 220.2) and attached to the sensor housing (110) such that the sensor element (120.2; 220.2) is exposed in the same manner as a sample (3) to an air flow prevailing in the weathering chamber (1).

12 Claims, 4 Drawing Sheets

Figure 2:
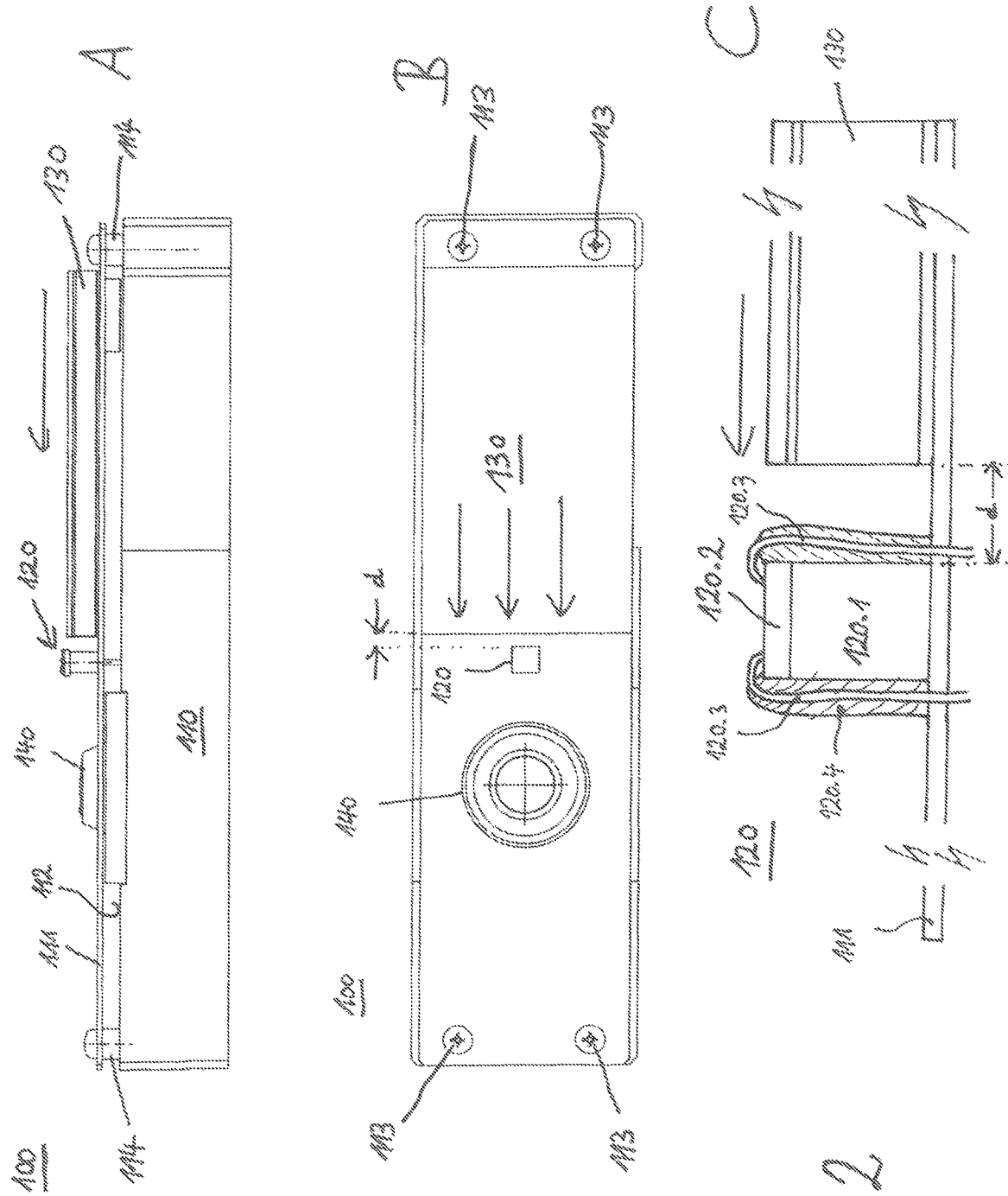

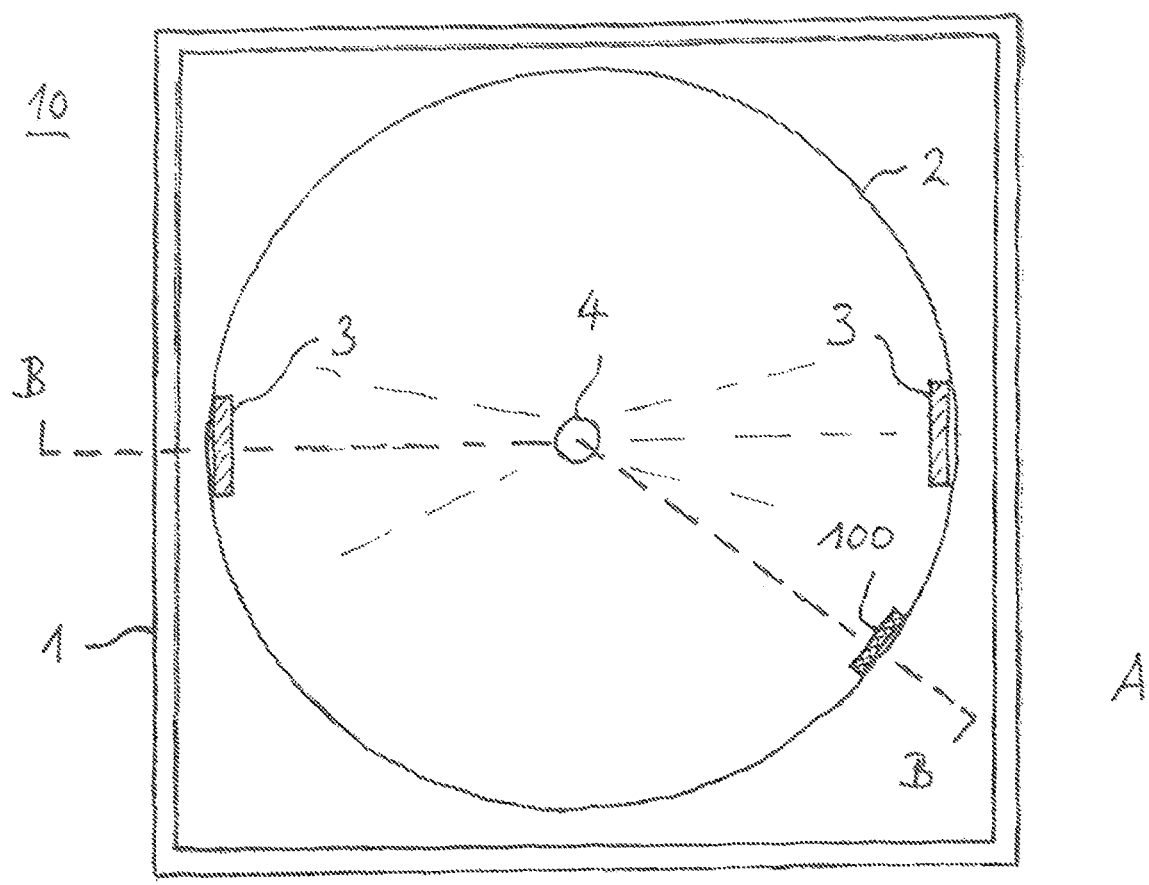
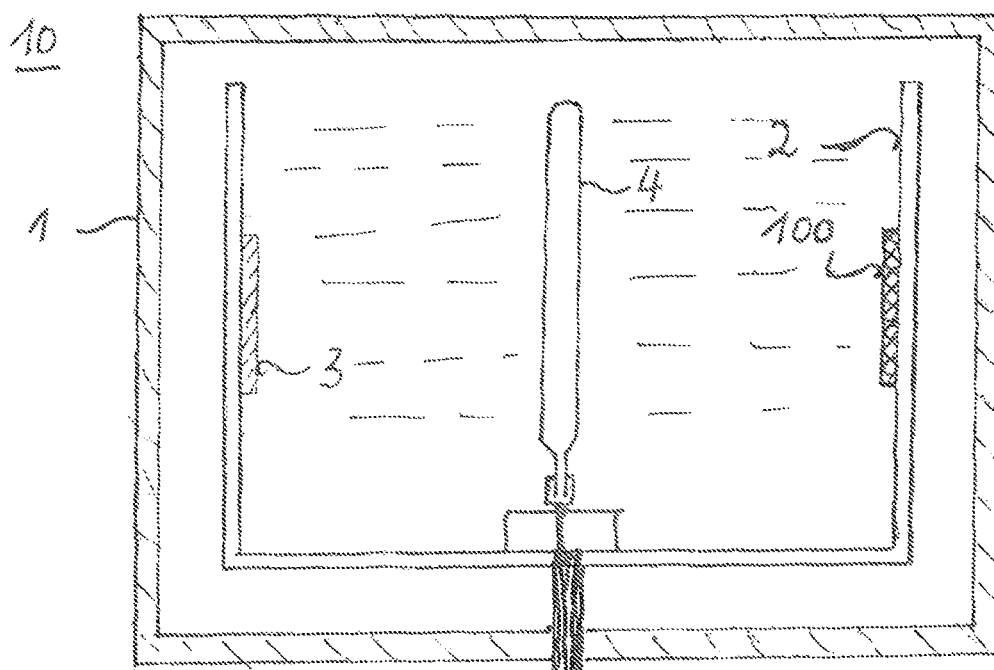
Fig. 1

SENSOR DEVICE WITH AN AIR MASS SENSOR FOR A WEATHERING DEVICE

RELATED APPLICATIONS

This application claims priority to European Patent Application 17202034.9, filed on Nov. 16, 2017, which is incorporated herein by reference.

TECHNICAL AREA

The present disclosure relates to a sensor device for a device for weathering or lightfastness testing of samples, to a device for weathering or lightfastness testing of samples containing such a sensor device and to a method for artificial weathering or lightfastness testing of samples using such a sensor device.

BACKGROUND

In devices for artificial weathering, an evaluation of the weather-related ageing behavior of a sample, in particular of a flat material sample, is carried out, the sample being exposed to artificial weathering. For this purpose, such devices usually have a weathering chamber in which mounting means for mounting the specimens to be exposed and a radiation source for exposing the specimens to radiation, in particular UV radiation, are arranged.

In such devices for artificial weathering or lightfastness testing of material samples, the service life of materials that are constantly exposed to natural weather conditions in their application and thus deteriorate under climatic influences such as sunlight, solar heat, humidity and the like is usually to be estimated. In order to obtain a good simulation of the natural weather conditions, it is advantageous if the spectral energy distribution of the light generated in the device corresponds as closely as possible to that of the natural solar radiation, for which reason xenon gas discharge lamps can be used as radiation sources in such devices. In addition, a timely accelerated ageing test of the materials is essentially achieved by irradiation of the specimens with a light intensity which is strongly intensified compared to the natural conditions, whereby the ageing of the specimens is accelerated. Thus, after a relatively short time, a statement can be made about the long-term ageing behavior of a material sample.

It is an object of the present disclosure to provide an improved device for weathering or lightfastness testing of samples, in particular one with improved sensor technology, and a corresponding sensor device. This object is solved by the features of the independent patent claims. Advantageous further embodiments and forms of implementation are provided in the subclaims.

SUMMARY

According to a first aspect of the disclosure, a sensor device for a device for weathering or lightfastness testing of samples comprises a sensor housing adapted to be arranged in a weathering chamber of the device in the same manner as a sample and an air mass sensor having a sensor element and attached to the sensor housing such that the sensor element is exposed in the same manner as a sample to an air flow prevailing in the weathering chamber.

According to a second aspect of the disclosure, a device for weathering or lightfastness testing of samples comprises a weathering chamber, and an air mass sensor disposed in the weathering chamber having a sensor element exposed in the same manner as a sample to an air flow prevailing in the weathering chamber.

According to a third aspect of the disclosure, in a method of artificial weathering or lightfastness testing of samples, a number of samples are placed in a weathering chamber, and during a test run of artificial weathering, an air stream is introduced into the weathering chamber and the flow velocity of the air stream is measured by means of an air mass sensor.

The skilled person recognizes additional features and benefits when reading the following detailed description and enclosed drawings.

SHORT DESCRIPTION OF THE DRAWINGS

The attached drawings are examples of embodiments and, together with the description, serve to explain the principles of the present disclosure and details of the examples of embodiments.

FIG. 1 comprises FIGS. 1A and 1B and shows a cross-section (A) and a longitudinal section (B) through an example of a device for artificial weathering or light fastness testing with a number of samples to be weathered and a sensor device carried along.

FIG. 2 comprises FIGS. 2A, 2B and 2C and shows a longitudinal section (A) and a top view (B) of a sensor device according to an embodiment and an enlarged side view of the air mass sensor (C) using a metallic layer as the sensor element.

Figure 3:
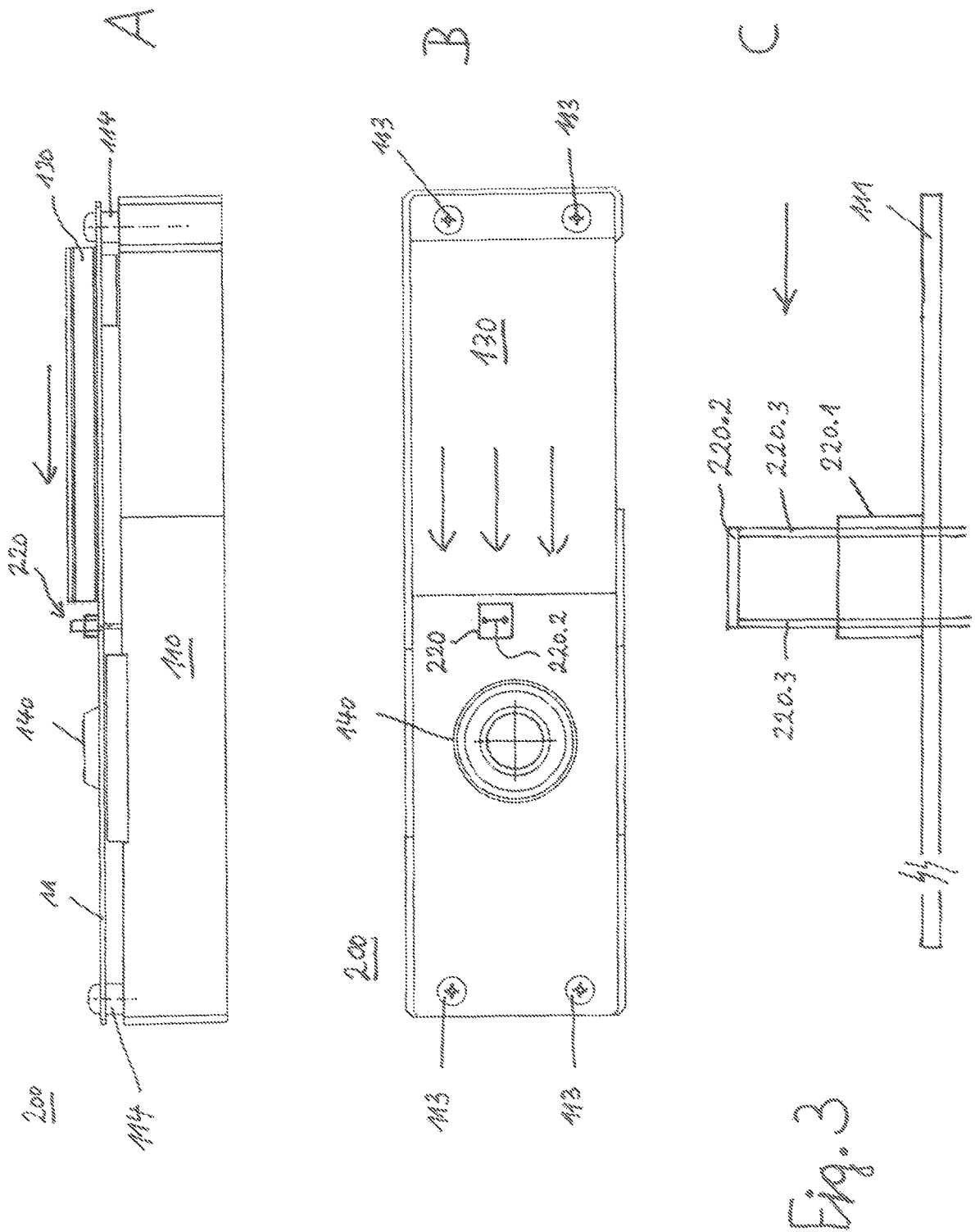

FIG. 3 comprises FIGS. 3A, 3B and 3C and shows a longitudinal section (A) and a top view (B) of a sensor device according to an embodiment and an enlarged side view of the air mass sensor (C) using a metallic wire as the sensor element.

Figure 4:
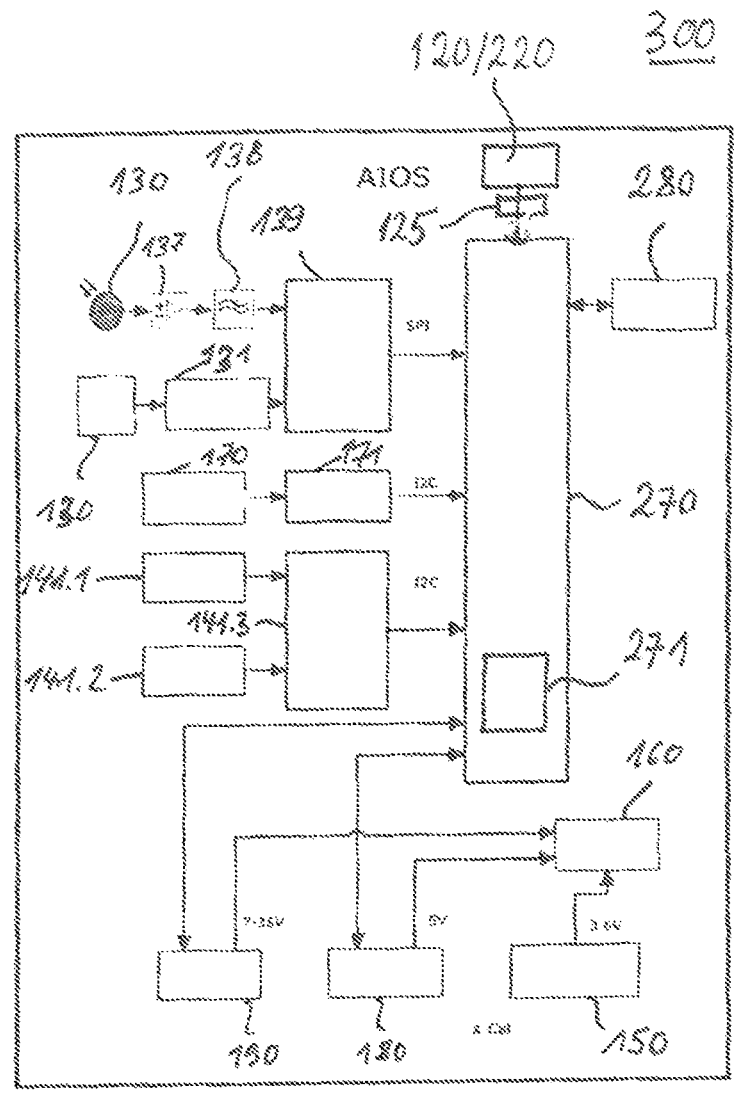

FIG. 4 shows a block diagram of an electrical circuit of a sensor device according to an example.

DETAILED DESCRIPTION

The following detailed description refers to the attached drawings which form part of this and in which, for illustrative purposes, specific embodiments are shown in which the invention can be implemented. In this respect, directional terminology such as "top", "bottom", "front", "back", "upper", "lower", etc. is used with reference to the orientation of the figure(s) described. Since components of forms of implementation of the present disclosure can be positioned in a number of different orientations, the directional terminology is illustrative and in no way restrictive. It is understood that other embodiments may be used and that structural or logical changes may be made without departing from the scope of protection of the present disclosure. The following detailed description is therefore not to be understood in a restrictive sense and the scope of protection of the present disclosure is defined by the attached claims.

To the extent that the following description, patent claims or drawings express that elements such as mechanical elements or circuit elements are "connected", "electrically connected" or "electrically coupled" to each other, this may mean that the said elements are directly coupled to each other, i.e. without further elements in between. However, it can also mean that the mentioned elements are not directly coupled to each other and that further elements are coupled between the mentioned elements. Insofar as identical reference signs are used in the figures, these refer to identical or functionally identical elements, so that in these cases the description of these elements is not repeated.

A large part of the material samples examined in weathering devices consists of polymeric materials. In these materials, the weather-related deterioration is essentially caused by the UV component of the solar radiation. The primary photochemical processes, i.e. the absorption of photons and the generation of excited states or free radicals, are temperature-independent. In contrast, the following reaction steps with the polymers or additives can be temperature-dependent, so that the observed ageing of the materials is also temperature-dependent. The degree of temperature dependence depends on the material to be investigated and the change of the property under consideration.

In order to take this fact into account, the room temperature and/or the sample temperature can be kept constant during artificial weathering of polymeric materials. Because of the temperature dependence of ageing, keeping the temperature constant and knowing the temperatures are important in order to be able to compare the results of different weathering runs with each other.

Since it is problematic to directly measure the sample temperature of the material samples to be examined, one or more temperature sensors can be used in a weathering tester according to the invention, whose measured temperature can be used as a measure for the sample temperature. For example, black panel sensors, black standard sensors or white standard sensors can be used as such temperature sensors. If in the following only black standard sensors will be mentioned, then all of the afore-mentioned sensors should be included. A weathering tester, for example, can have a weathering chamber in which a xenon radiation source can be provided as a light source for emitting light with a predetermined intensity. Inside the weathering chamber there may be a cylindrical symmetrical sample holder frame which is rotatably mounted around the radiation source. Both material samples to be examined and sensor devices with black standard sensors can be supported by this sample holder frame, so that the material samples and the black standard sensors are exposed to the radiation field of the light source and the other conditions set within the weathering chamber under the same conditions. In order to be able to control the sample temperature within certain limits and to make it more uniform within the weathering chamber, an additional air flow can be introduced into the weathering chamber, which passes the sample holder frame and the material samples held therein and the black standard sensor cylinder-symmetrically with respect to the radiation source. The air flow can dissipate part of the heat from the material samples and the black standard sensor. This can be exploited, for example, for temperature control by using the temperature measured by the black standard sensor as a control signal for the strength of the airflow introduced into the weathering chamber.

The present disclosure is based on the knowledge that it can be advantageous to measure the air mass flow occurring during a test run or the flow velocity of the air mass flow. On the one hand, this opens up the possibility of better comparability of test results and can also be used to adjust the air flow introduced into a weathering chamber to defined values.

A sensor device according to the first aspect comprises a sensor housing having an air mass sensor and being arrangeable in a weathering chamber of the device in the same manner as a sample. Depending on the type of weathering device, the samples can either be attached to a rotating support frame in the weathering chamber or can be fixed stationary in a suitable manner. Ideally, therefore, both the shape and dimensions of the sensor housing are substantially the same as the shape and dimensions of commonly used samples or sample holders, so that the sensor housing can be mounted on a rotating support frame or stationary in the weathering chamber instead of a sample or sample holder. In particular, the sensor housing may have a cuboid basic shape. In general, all types of weathering chambers are equipped with appropriately designed receiving elements or devices in or on which the samples to be weathered can be picked up and fastened in a suitable manner. It may therefore be provided that the sensor device can be mounted and fastened to the same receiving elements or devices without the need for additional measures.

The air mass sensor has a sensor element and is attached to the sensor housing in such a way that the sensor element is exposed to an air flow prevailing in the weathering chamber in the same way as a sample.

According to an example of the sensor device, the air mass sensor is arranged according to the principle of a heating wire sensor and the sensor element is given by a current-carrying metallic layer or layer. Such a metallic layer can, for example, comprise or consist of platinum, nickel or tungsten or alloys of these and, if necessary, other metals, whereby the metallic layer is applied to a substrate, in particular a ceramic substrate. In the case of platinum as a metallic layer, Pt1000 in particular, i.e. a platinum layer with a nominal resistance of $R_0=1$ k$\Omega$, can be used, as it is also used, for example, for commercially available temperature sensors.

According to another example, the substrate is in the form of a column or stator which rises vertically from a main surface of the sensor housing so that a metallic layer applied to a surface of the substrate remote from the main surface of the sensor housing is exposed to the air flow, in particular in the same way as the sample. According to a further embodiment thereof, the dimensions of the substrate, in particular the length of the column, may be such that a surface of the metallic layer lies substantially in the same plane as a surface of the sample.

According to another example of a sensor device, the air mass sensor may be designed as a hot-wire sensor and the sensor element may be given by a metallic wire which may comprise or consist of platinum, nickel or tungsten or alloys thereof and, where appropriate, other metals. Also in this case, the hot wire can be arranged on a column projecting vertically away from a main surface of the sensor housing in such a way that it essentially lies in a plane with a surface of the sample.

As indicated above, it is preferably intended that the sensor element should lie substantially in the same plane as the sample. If the air mass sensor is arranged according to the principle of a hot-wire sensor, the metallic wire or metallic layer can thus lie essentially in the same plane as the surface of the sample.

According to an example of the sensor device, at least one further sensor is mounted in or on the sensor housing, wherein one or more further sensors of a group comprising a black panel or black standard sensor, a UV radiation sensor, an air temperature sensor, and a humidity sensor may be associated.

According to an example of the sensor device, the air mass sensor is mounted to an outer wall of the sensor housing, the outer wall may be formed by a plate spaced from a first outer wall of the sensor housing. The sensor housing may have a cuboid basic shape, the plate may be rectangular and may have substantially the same dimensions as the first outer wall. It can be fixed to the first external wall at its four corners by means of four screws, the screws being guided inside spacer sleeves located between the plate and the first external wall and providing the desired distance between the plate and the first external wall.

According to another example of the sensor device, a black panel or black standard sensor may be mounted on an outer wall of the sensor housing, in particular on the plate spaced from the first outer wall of the sensor housing as described above.

According to an example of the sensor device, an electrical power supply, such as a battery or accumulator, is located inside the sensor housing. This is connected to a circuit and can supply the components of the circuit as well as the air mass sensor and any other sensors present with the necessary electrical power.

According to an example of the sensor device, it is arranged to transmit the output signals of the air mass sensor to a central control unit. In the central control unit, the output signals of the air mass sensor can be stored and evaluated and, if necessary, also used for the control of test runs, in particular for the control of the supply of the air mass flow.

According to an example of the sensor device, a circuit board, in particular a printed circuit board (PCB), is arranged inside the sensor housing, on which circuit board a control unit can be arranged, to which output signals of the air mass sensor and any possibly further sensors can be fed. It may also be provided that a memory unit is arranged on the circuit board, on which memory unit data of the output signals of the air mass sensor and possibly further sensors can be stored.

FIG. 1, comprising FIGS. 1A and 1B, shows a schematic representation of a device for artificial weathering or lightfastness testing of samples in a cross-section (A) and a longitudinal section (B) along the dashed line B-B drawn in FIG. 1A, respectively. The apparatus 10 comprises a weathering chamber 1 within which artificial weathering or lightfastness testing of samples can be performed. In the weathering chamber 1 a ring-shaped closed support frame 2 is rotatably mounted, which on its inside has suitably shaped support elements (not shown), by means of which samples 3 or workpieces, for example rectangular lacquer samples of standardized size, can be supported. The support frame 2 is circular, especially in a lateral cross-section, so that the samples 3 are guided on a closed circular path when the support frame 2 is rotated. A radiation source 4, which can be formed by a xenon gas discharge lamp, for example, is arranged inside the support frame 2 and essentially concentrically with it. It may be provided that a plurality of samples 3 can be attached to the holder frame 2, in particular to holder elements provided for this purpose and arranged in the circumferential direction of the holder frame 2. In addition, the specimens 3 can also be attached to the support frame 2 in several planes one above the other.

In the weathering chamber 1 there is also arranged a sensor device 100, which contains an air mass sensor. Like the samples 3, the sensor device 100 can be attached to the mounting frame 2 and rotate with it around the arrangement comprising or consisting of the radiation source 4, i.e. it can be arranged as a travelling sensor device 100. The output signals of the sensor device 100 or the air mass sensor contained in it can be fed to an external central control device. In particular, the sensor device 100 can be designed such that the parameters it detects are output as corresponding electrical measurement signals and fed to the external central control device. The sensor device 100 can, as shown, be offset with respect to the samples 3 in the circumferential direction of the holding device 2. It could just as well be offset with respect to specimens 3 in the height direction or with respect to specimens 3 in the height direction as well as in the circumferential direction without circumferential displacement.

For the reasons mentioned above, it is intended that an air flow is introduced into the weathering chamber 1, which passes the samples 3 and the radiation source 4 in, for example, a vertical direction. The flow velocity of this airflow is to be measured by the air mass sensor.

FIG. 2 comprising FIGS. 2A, 2B and 2C shows a sensor device according to the first aspect in a longitudinal section (A) and in a plan view (B) and an air mass sensor in an enlarged side view (C). The airflow flows in a vertical direction through the weathering chamber, i.e. in a direction indicated by the arrows in FIGS. 2A to 2C.

The sensor device 100 contains a sensor housing 110 made of stainless steel, which may have an essentially cuboid basic shape. In front of a first outer wall 112 of the sensor housing 110, a plate 111 maybe fastened to this at a distance from the first outer wall 112. The mounting can be done, as shown, by means of screws 113 arranged in the area of the four corners of the plate 111, which can be guided by spacer sleeves 114 between the plate 111 and the first outer wall 112 and screwed into corresponding holes in the area of the four corners of the first outer wall 112. A black standard sensor 130 maybe attached to the plate 111, which faces the radiation source 4 of the weathering device 10 during operation of a weathering device 10.

The black standard sensor 130 can be constructed in such a way that it has a stainless steel plate with a black painted surface facing the radiation source 4 during operation and a temperature-dependent electrical component thermally coupled to the stainless steel plate on its rear side. The electrical component can be formed by a temperature-dependent resistor such as a platinum resistor (commercially available designations Pt100 or Pt1000) and connected to an electrical measurement converter circuit. In particular, a plastic plate made of PVDF (polyvinylidene fluoride) enclosing the platinum resistor and an end plate made of stainless steel can be mounted on the back of the stainless steel plate. In contrast to the black standard sensor, a black panel sensor consists of a metal plate blackened on both sides without PVDF insulation, whereby the temperature-dependent resistance is applied to the back of the stainless steel plate without surrounding insulation. Such black standard or black panel sensors can be used in weathering devices to provide a black standard temperature for each weathering process. The black standard temperature represents an upper limit for the range of the surface temperature of the material sample in question. In addition, a white standard sensor can be used whose temperature measurement provides a lower limit of this range. Thus the sample temperature can be limited and the arithmetic mean value of the measured temperatures can be assumed as a first approximation for the sample temperature.

An air mass sensor 120 maybe mounted on the plate 111 in the immediate vicinity of the black standard sensor 130. The air mass sensor 120 can have a column-shaped shaft 120.1 with a square (or circular) cross-section, on the upper surface of which a metallic layer 120.2 is applied, which serves as the actual sensor element. The air mass sensor 120 may work according to the principle of the hot-wire sensor. According to this principle, a current flows through the metallic layer 120.2 and is resistance heated in this way. As a result of the flow of air, indicated by the arrows, heat is extracted from the metallic layer 120.2, which leads to a change in resistance. Now either the sensor can be heated with a constant current and the changing voltage decreasing at the sensor can be measured (CCA, Constant-Current Anemometry), or the sensor can be kept at an average constant temperature by a control loop (CTA, Constant-Temperature Anemometry). In any case, the relationship between the temperature and the resistance can be used to measure the flow velocity of the airflow. The thickness of the metallic layer 120.2 can be in a range between 0.5 µm and 500 µm, especially in a range between 1 µm and 200 µm, especially in a range between 10 µm and 100 µm.

The substrate 120.1, for example, can be a ceramic substrate. A distance d between an outer wall of the substrate 120.1 facing the black standard sensor 130 and the outer wall of the black standard sensor 130 facing the substrate 120.1 can be in a range between 0.5 mm and 500 mm, especially in a range between 0.5 mm and 100 mm, especially in a range between 1 mm and 10 mm. This small distance ensures that the air mass sensor 120 has essentially the same flow conditions as the black standard sensor 130 and thus also the samples arranged laterally next to the black standard sensor 130.

The electrical contacting of the sensor element 120.2 can be arranged as shown in such a way that electrical connecting wires 120.3 maybe welded to the metallic layer 120.2 and fused in glass 120.4 over their remaining length. The connecting wires 120.3 maybe led down through the plate 111 on the outer wall of the substrate 120.1 and connected to the circuit board, where the output signals of the air mass sensor 120 can be fed to a unit such as the control unit 270.

The sensor device 100 may also have a UV radiation sensor 140, which also faces the radiation source 4 during operation of the weathering device 10. The UV radiation sensor 140 maybe attached to the plate 111 and may have an upward tapered truncated cone shaped elevation, which may have an entrance opening for the radiation at its upper flattened end. An opening is formed in the plate 111 through which the radiation can impinge on a UV sensor element located under the plate 111.

FIG. 3 comprises FIGS. 3A to 3C and shows a longitudinal section (A) of and a top view (B) on a sensor device according to an example and an enlarged side view of an air mass sensor (C) having a hot wire.

The sensor device 200 according to FIG. 3 differs from the sensor device 100 according to FIG. 2 only in the type of air mass sensor. All other details of the sensor device 200 correspond to those of the sensor device 100 of FIG. 2, whereby the same reference signs were used accordingly.

The sensor device 200 of FIG. 3 has an air mass sensor 220, which contains a sensor element 220.2 in the form of a hot wire. The hot wire can have a diameter in a range between 2.0 µm and 10 µm and can be clamped between two much thicker steel tips 220.3 to which it is welded. The steel tips 220.3 are passed through a substrate 220.1, which can be formed as a ceramic substrate and provides mechanical stability and electrical insulation. The steel tips 220.3 protrude vertically upwards from an upper surface of the substrate 220.1. The steel tips 220.3 can be connected at their lower end with connecting wires, which can be guided downwards along the substrate 220.1 in a similar way to the air mass sensor 120 of FIG. 1.

The hot wire 220.2 detects the velocity component of the air flow in a plane perpendicular to the wire. Since the airflow flows through the weathering chamber in a vertical direction, i.e. in a direction indicated by the arrows in FIGS. 3A to 3C, the air mass sensor 220 is conveniently arranged so that the hot wire 220.2 is oriented perpendicular to the airflow, as shown in FIG. 3B.

The present disclosure according to its second aspect also refers to a device for weathering or lightfastness testing of samples, which device has a weathering chamber 1 and an air mass sensor 120 or 220 arranged in the weathering chamber 1. The air mass sensor 120 or 220 has a sensor element 121 or 221 which, in the same way as a sample 3, is exposed to an air flow prevailing in the weathering chamber 1. The air mass sensor 120 or 220 can be part of a sensor device 100 or 200 according to the first aspect.

The present disclosure according to its third aspect also refers to a method for artificial weathering or lightfastness testing of samples, in which method a number of samples are arranged in a weathering chamber and during a test run of artificial weathering an air flow is introduced into the weathering chamber and the flow velocity of the air flow is measured by means of an air mass sensor.

According to an embodiment of the method, the samples are formed by pasty substances.

According to an embodiment of the method, the output signals of the air mass sensor are used to control the air mass supply to the weathering chamber.

FIG. 4 shows a block diagram of an electrical circuit of a sensor device. In addition to the 120/220 air mass sensor, the circuit 300 shown contains other sensors which are described below, as well as electrical components which may be mounted on the above circuit board. Circuit 300 has a control unit 270 to which output signals of the air mass sensor 120/220 and the other sensors can be fed. The control unit 270 can be formed by a microprocessor or microcontroller of known design.

The air mass sensor 120/220 maybe connected on the output side to a control circuit 125 arranged on the circuit board, which controls the air mass sensor 120/220 in a suitable manner. The output signals supplied by the air mass sensor 120/220 representing the flow velocity can then be converted into digital output signals by an A/D converter contained in the control loop 125 and supplied in this form to the control unit 270.

A first storage unit 280 may also be bidirectionally connected to the control unit 270, on which data specific to the UV radiation sensor 140 may be stored. The first memory unit 280 can be formed by a DRAM memory, in particular a ferroelectric DRAM memory (FRAM). The control unit 270 may also have a second memory unit 271 on which data specific to a radiation source of the weathering device may be stored. The UV radiation sensor 140 can be connected on the output side to an amplifier 137 and a low pass filter 138, the output of which can be connected to an A/D converter 139. The black standard sensor 130 can be connected on the output side to a signal conditioning circuit 131, the output of which can be connected to an A/D converter 139. The A/D converter 139 can in turn be connected on the output side to the control unit 270. An air temperature sensor 141.1 and a humidity sensor 141.2 can each be connected on the output side to a data processor 141.3, the output of which can be connected to the control unit 270. A further temperature sensor 170 can be arranged on the circuit board and connected on the output side to a signal conditioning circuit 171, which in turn can be connected on the output side to the control unit 270. Circuit 200 may also include a battery 150, a power supply/control circuit 160 connected to the battery 150, a USB interface 180 connected to circuit 160, and a 485/422 interface 190 connected to circuit 160.

Although specific embodiments have been presented and described in this description, it is clear to the specialist in the field that the specific embodiments shown and described can be replaced by a variety of alternative and/or equivalent implementations without departing from the scope of protection of this disclosure. This application is intended to cover any adaptations or changes to the specific embodiments discussed herein. Therefore, it is provided that this disclosure is limited only by the claims and their equivalents.

The invention claimed is:

1. A sensor device for a device for weathering or lightfastness testing of samples, comprising:
    a sensor housing;
    a black panel or black standard sensor attached to the sensor housing; and
    an air mass sensor designed according to the principle of a hot-wire sensor and comprising a sensor element configured to sense an air flow and attached to the sensor housing near to the black panel or black standard sensor, wherein:
        the air mass sensor comprises a shaft,
        the sensor element comprises a metallic layer applied to an upper surface of the shaft, and
        a height of the shaft is dimensioned such that an upper surface of the metallic layer is essentially coplanar with an upper surface of the black panel or black standard sensor.

2. The sensor device according to claim 1, in which the sensor housing comprises a cuboid shape.

3. The sensor device according to claim 1, in which the metallic layer comprises platinum, nickel or tungsten and is deposited on a substrate.

4. The sensor device according to claim 1, in which the air mass sensor is attached to an outer wall of the sensor housing such that the sensor element faces away from the outer wall.

5. The sensor device according to claim 4, in which the outer wall is formed by a plate spaced from a first outer wall of the sensor housing.

6. The sensor device according to claim 1, in which at least one further sensor is mounted in or on the sensor housing.

7. The sensor device as claimed in claim 6, in which the at least one further sensor is at least one of:
    a UV radiation sensor,
    an air temperature sensor, or
    a humidity sensor.

8. The sensor device according to claim 1, in which the black panel or black standard sensor is attached to an outer wall of the sensor housing.

9. A device for weathering or lightfastness testing of samples, comprising
    a weathering chamber;
    a black panel or black standard sensor disposed in the weathering chamber; and
    an air mass sensor disposed in the weathering chamber near to the black panel or black standard sensor and designed according to the principle of a hot-wire sensor and comprising a sensor element configured to sense an air flow, the sensor element comprising a metallic layer, wherein an upper surface of the metallic layer is essentially coplanar with an upper surface of the black panel or black standard sensor.

10. The device according to claim 9, in which the air mass sensor is part of a sensor device comprising a sensor housing and is attached to a sensor housing of the sensor device.

11. A method of artificially weathering or lightfastness testing of samples, the method comprising:
    placing in a weathering chamber a number of samples, a black panel or black standard sensor, and an air mass sensor near to the black panel or black standard sensor, wherein:
        the air mass sensor is designed according to the principle of a hot-wire sensor and comprises a sensor element configured to sense an air flow,
        the sensor element comprises a metallic layer, and
        an upper surface of the metallic layer is essentially coplanar with an upper surface of the black panel or black standard sensor; and
    introducing the air flow into the weathering chamber during a test run of an artificial weathering and measuring a flow velocity of the air flow by the air mass sensor.

12. The method according to claim 11, in which the samples are formed by pasty substances.

* * * * *